US008995002B2

(12) United States Patent
McFarland et al.

(10) Patent No.: US 8,995,002 B2
(45) Date of Patent: Mar. 31, 2015

(54) SYSTEM AND METHOD FOR PRINTING INDEPENDENT OF LOCATION AND USING A UNIVERSAL PRINT MODULE

(75) Inventors: Max E. McFarland, Sunnyvale, CA (US); Andrea Mariotti, San Carlos, CA (US); Daja Phillips, Palo Alto, CA (US); Susan Dybbs, San Francisco, CA (US)

(73) Assignee: Ricoh Co., Ltd., Tokyo (JP)

( * ) Notice: Subject to any disclaimer, the term of this patent is extended or adjusted under 35 U.S.C. 154(b) by 870 days.

(21) Appl. No.: 12/613,380

(22) Filed: Nov. 5, 2009

(65) Prior Publication Data

US 2010/0238486 A1 Sep. 23, 2010

Related U.S. Application Data

(60) Provisional application No. 61/161,712, filed on Mar. 19, 2009.

(51) Int. Cl.
*G06F 3/12* (2006.01)
*G06K 15/00* (2006.01)
*G06F 7/00* (2006.01)
*G06F 17/00* (2006.01)
*G06F 9/46* (2006.01)
*G06F 9/44* (2006.01)
*G06F 3/00* (2006.01)
*G06F 13/00* (2006.01)

(52) U.S. Cl.
CPC ............ *G06F 3/1228* (2013.01); *G06F 3/1206* (2013.01); *G06F 3/128* (2013.01)
USPC ......... 358/1.16; 358/1.15; 707/609; 707/621; 718/100; 718/102; 719/321; 719/327

(58) Field of Classification Search
USPC ............. 358/1.13, 1.15, 1.16, 1.6, 1.17, 1.18, 358/401, 402, 403, 404, 407, 434, 435, 442, 358/443, 444, 296; 399/82, 83, 85; 718/1, 718/100, 101, 104, 406, 102; 715/200, 276, 715/277, 733, 734, 748; 707/609, 621; 719/321, 327
See application file for complete search history.

(56) References Cited

U.S. PATENT DOCUMENTS

| | | | | |
|---|---|---|---|---|
| 7,423,776 B2* | 9/2008 | Murata | ........................ | 358/1.16 |
| 7,676,491 B2* | 3/2010 | Jansen et al. | ........... | 707/999.102 |
| 7,771,133 B2* | 8/2010 | Oomura et al. | .................. | 400/62 |
| 8,199,355 B2* | 6/2012 | Shao et al. | .................... | 358/1.16 |
| 8,237,966 B2* | 8/2012 | Honda | ........................ | 358/1.15 |
| 8,243,306 B2* | 8/2012 | Inoue | ............................ | 358/1.15 |
| 8,370,299 B2* | 2/2013 | Chrisop et al. | ................. | 707/621 |
| 2007/0104525 A1* | 5/2007 | Isshiki | ............................ | 400/62 |

(Continued)

*Primary Examiner* — Fred Guillermety
*Assistant Examiner* — Jonathan R Beckley
(74) *Attorney, Agent, or Firm* — Patent Law Works LLP

(57) ABSTRACT

A system for printing independent of location and using a universal print module comprises a computing device having a print anywhere sending module and a printer having a print anywhere receiving module coupled by a network. The print anywhere sending module is adapted to interface with the computing device to generate a print file. The print anywhere sending module broadcasts the availability of a print file or job and transmits that print job to a responding print anywhere receiving module. The print anywhere receiving module interfaces with the printer to provide the print file and to print the file. The present invention also includes a variety of methods including a method for printing, a method for printing using a universal print module, and a method for printing using the print key.

20 Claims, 18 Drawing Sheets

(56) References Cited

U.S. PATENT DOCUMENTS

2007/0279689 A1* 12/2007 Aoki et al. .................. 358/1.16
2008/0225338 A1* 9/2008 Mullender et al. ........... 358/1.16
2009/0033997 A1* 2/2009 Nobushima .................. 358/1.15

* cited by examiner

SYSTEM AND METHOD FOR PRINTING INDEPENDENT OF LOCATION AND USING A UNIVERSAL PRINT MODULE

CROSS-REFERENCE TO RELATED APPLICATIONS

This application claims priority under 35 USC §119(e) to U.S. provisional patent application Ser. No. 61/161,712, filed Mar. 19, 2009, entitled "Print Key" which is incorporated by reference in its entirety.

BACKGROUND OF THE INVENTION

1. Field of Art

The present invention generally relates to the field of printing. More particularly, the present invention relates to systems and methods for printing independent of location and using a universal print module. Still more particularly, the present invention relates to a print key for use in printing.

2. Description of the Related Art

In general, computing devices have become common place and are used in almost every environment such as office, home, public settings, library, hotels, restaurants, etc. The computing devices are often portable such as but not limited to laptop computers, notebook computers, netbook computers, smart phones and the like. Even for corporate portable computing devices, the portable computing devices are often used in multiple different office locations. When the portable computing devices are used at the base office for the user, the portable computing devices typically have a printer set up and installed so the user is able to print. However, when the portable computing device is use in one of the other offices, it typically does not have a printer set up for that location. This creates a problem because it is often difficult to print using one's portable computing device except when in one's base office.

While it is not impossible to be able to print at these other locations, it typically requires a significant amount of time and effort to configure one's computer to be able to print at such other office locations. For example, users often will ask colleagues to printed documents for them typically by transferring their file to their colleague using a USB flash drive rather than trying to configure their computing device to print. One particular problem is that in order to print on a specific printer, the print driver for that printer must be loaded and enabled on a computing device. Offices often include several printers of different makes and models, and thus, requiring different print drivers. Another problem in printing is connection of the portable computing device to the printer for interaction with each other because many networks have security that prevents such interaction.

SUMMARY OF THE INVENTION

The present invention includes systems and methods for printing independent of location and using a universal print module. In one embodiment, the present invention comprises a computing device having a print anywhere sending module and a printer having a print anywhere receiving module coupled by a network. The print anywhere sending module is adapted to interface with the computing device to generate a print file. The print anywhere sending module broadcasts the availability of a print file or job and transmits that print job to a responding print anywhere receiving module. The print anywhere receiving module interfaces with the printer to generate an output of the print file by the printer.

In another embodiment, the present invention comprises a print key having a printer interface module, a computing device interface module and a print queue module. The print key is preferably a USB flash drive and also includes a USB communication module. The print key is coupled to the computing device and receives and stores a print file for printing. The print key is then decoupled from the computing device and coupled to the printer. The print key includes a print key module adapted to interface with the printer and provide the store print file to the printer for printing.

The present invention also includes a variety of methods including a method for printing, a method for printing using a universal print module, and a method for printing using the print key.

BRIEF DESCRIPTION OF THE DRAWINGS

The disclosed embodiments have other advantages and features which will be more readily apparent from the detailed description, the appended claims and the accompanying figures (or drawings).

DETAILED DESCRIPTION OF THE PREFERRED EMBODIMENTS

Figure 1A:
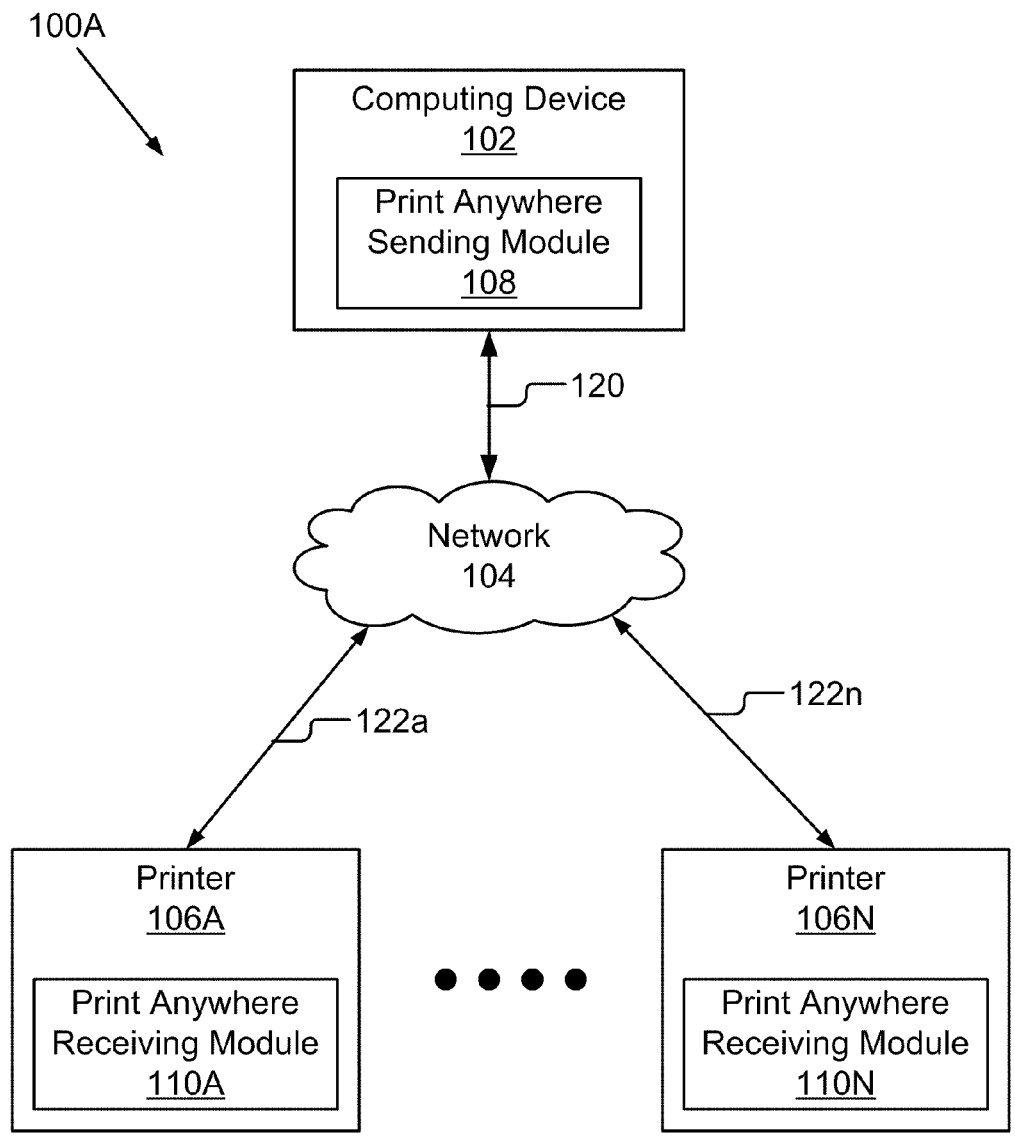
FIG. 1A is a block diagram of a first embodiment of a print anywhere system in accordance with the present invention.

Systems and methods for printing independent of location and using a universal print module. The figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

As used herein any reference to "one embodiment," "an embodiment," or "some embodiments" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Also, some embodiments of the invention may be further divided into logical modules. One of ordinary skill in the art will understand that these modules can be implemented in hardware, firmware, and/or software. In one embodiment, the modules are implemented in form of computer instructions stored in a computer readable medium when executed by a processor cause the processor to implement the functionality of the module. Additionally, one of ordinary skill in the art will recognize that a computer or another machine with instructions to implement the functionality of one or more logical modules is not a general purpose computer. Instead, the machine is adapted to implement the functionality of a particular module. Moreover, the machine embodiment of the invention physically transforms the electrons representing the images in the document from one state to another in order to attain the desired format.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

System Overview

FIG. 1A is a block diagram of a first embodiment of a print anywhere system 100A in accordance with the present invention. Referring now to FIG. 1A, a first embodiment of the print anywhere system 100A comprises: a computing device 102, a network 104 and one or more printers 106A-N. FIG. 1A illustrates a minimal configuration for the print anywhere system 100A of the present invention with one computing device 102 and a plurality of printer 106A-N.

The computing device 102 is coupled communicatively to the network 104 by signal line 120. The computing device 102 can perform any variety of operations depending on its hardware, software and connectivity. The computing device 102 is a portable computer, a laptop computer, a notebook computer, a netbook computer, smart phone or similar computing device. The computing device 102 also includes a print anywhere sending module 108. The print anywhere sending module 108 is adapted to interface with the computing device 102 to present user interfaces, receive input, generates print files, generate and send notifications regarding print files and send print files. The print anywhere sending module 108 is described in more detail below with reference to FIG. 2.

The printers 106A-N are communicatively coupled by a respective signal line 122a-n to the network 104. The printers 106A-N also include a print anywhere receiving module 110A-110N. The print anywhere receiving module 110 is described in more detail below with reference to FIG. 3. The printers 106A-N are coupled by the network 104 to the computing device 102. In particular, the print anywhere receiving module 110 is coupled for communication and interaction with the print anywhere sending module 108 of the computing device 102. The printers 106A-N also include conventional printing components such as a print engine, paper handling, display devices, input buttons or devices and communication ports or interfaces such as but not limited to USB interface, CAT-5 network interface, serial port, parallel port, etc.

The print anywhere sending module 108 is adapted for communication, interaction and cooperation with the print anywhere receiving modules 110. In one embodiment, the print anywhere sending module 108 is software operating on the computing device 102 and may have any level of computing capability. The print anywhere receiving module 110 is any client software that is designed to perform a specific task and communicate using a method of the present invention. The print anywhere sending module 108 and print anywhere receiving modules 110 cooperate and communicate with each other to distribute print files, and generate and present user interfaces.

Figure 1B:
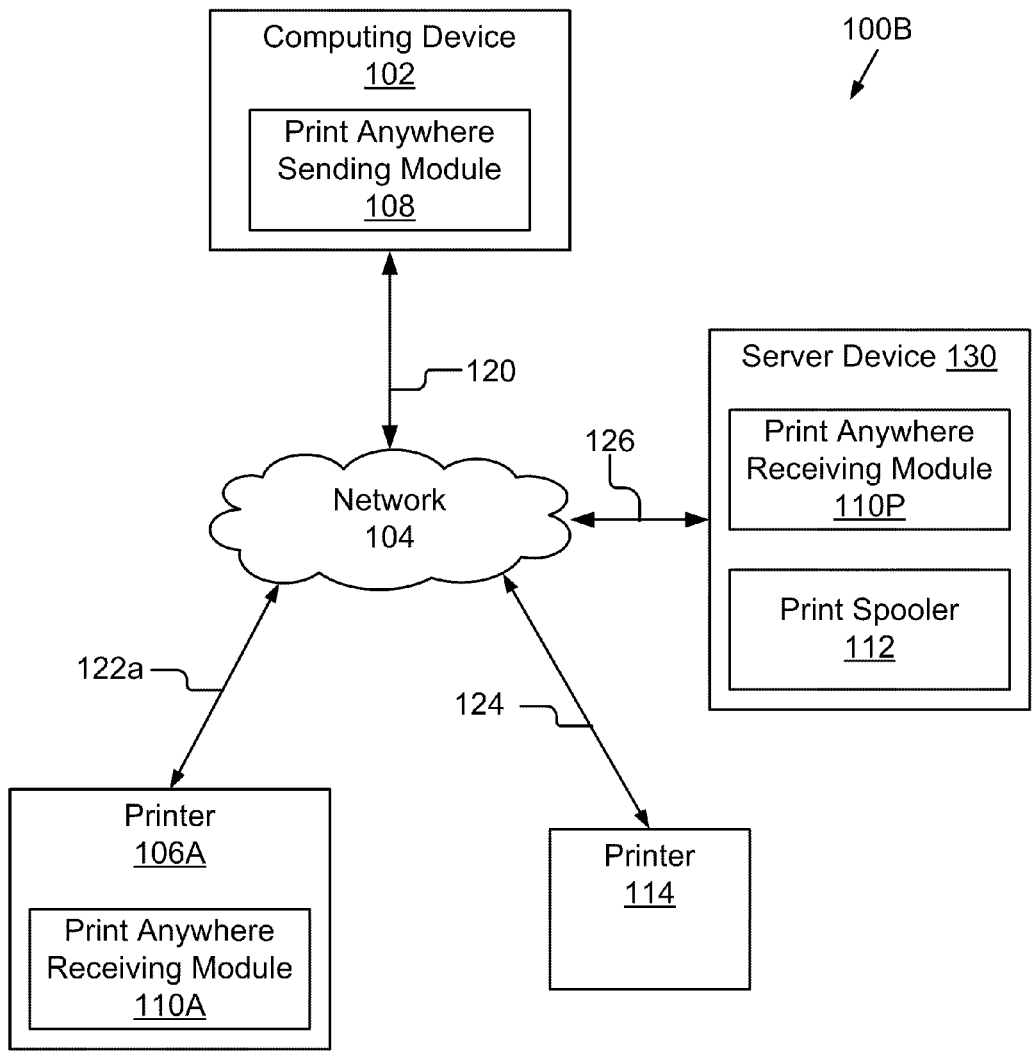
FIG. 1B is a block diagram of a second embodiment of a print anywhere system in accordance with the present invention.

FIG. 1B is a block diagram of a second embodiment of a print anywhere system 100B in accordance with the present invention. This second embodiment of the print anywhere system 100B comprises the computing device 102, the print anywhere sending module 108, the printer 106A and the print anywhere receiving module 110A coupled by the network 104 as has been described above. The computing device 102, the print anywhere sending module 108, the printer 106A, and the print anywhere receiving module 110A coupled by the network 104 have the same or similar functionality as that described above with reference to FIG. 1A. However, the second embodiment of the print anywhere system 100B also includes a conventional network enabled printer 114 and a server device 130 having a print anywhere receiving module 110P and a print spooler 112. The server device 130 is a conventional hardware server such as a print server or application server. In an alternate embodiment it is a computer with a processor and memory including server software. The server device 130 is coupled to the network 106 by signal line 126. The print anywhere receiving module 110P is similar to the other print anywhere receiving modules 110A-110N described above, and will be described in more detail below with reference to FIG. 3. The print anywhere receiving module 110P is capable of responding to notifications about print files and receiving print files. The print anywhere receiving module 110P is also coupled to and adapted for communication with the print spooler 112. The print spooler 112 is software of a conventional type that is operable on the server device 130. The print spooler 112 buffers print jobs for the printer 114 or other printers (not shown). FIG. 1B is used to illustrate one embodiment of the present invention where a single print anywhere receiving module 110P can be used to communicate with a variety of computing devices 102 and provide print jobs to one or more printers 114 associated with the server device 130.

Print Anywhere Sending Module 108

Figure 2:
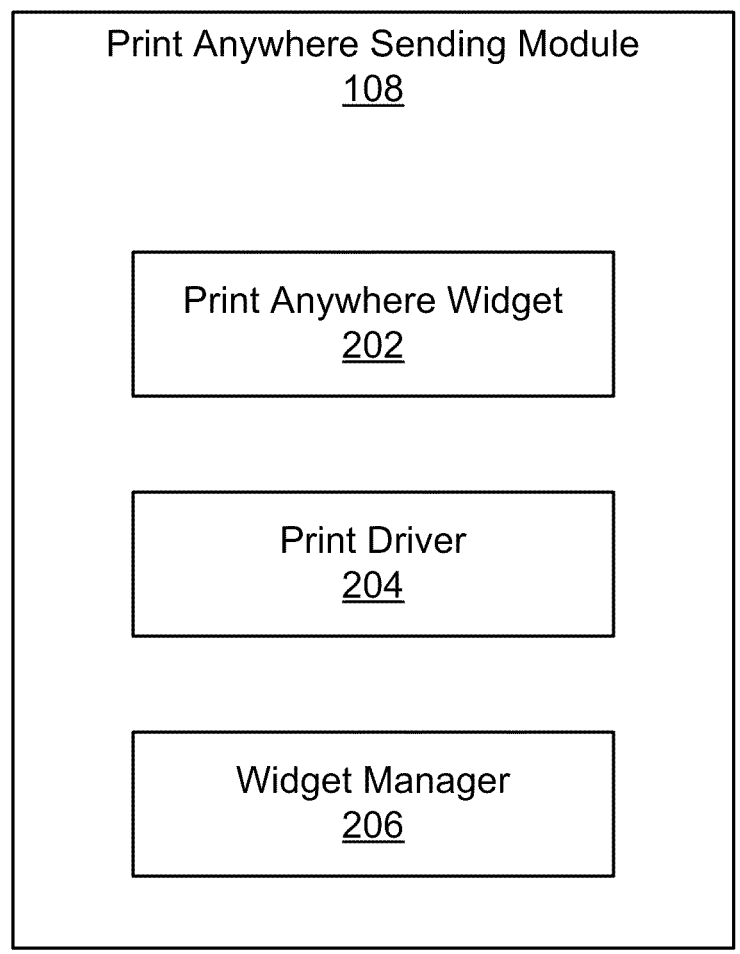
FIG. 2 is a block diagram of an embodiment of a print anywhere sending module in accordance with the present invention.

FIG. 2 is a block diagram of an embodiment of the print anywhere sending module 108 in accordance with the present invention. The print anywhere sending module 108 comprises a print anywhere widget 202, a print driver 204 and a widget manager 206.

The print anywhere widget 202 is software and routines operable on a processor of the computing device 102 to perform the methods of the present invention. In other embodiments, the print anywhere widget 202 is a hardware device or module. The print anywhere widget 202 is associated with one or more print drivers 204. The print anywhere widget 202 is installed and operable on the computing device 102 and provides the following functions. The print anywhere widget 202 continuously polls the directory (see below) used by the print driver 204 for the presence of a print job. In particular, the print job is a print file with the file name "job.prn." Once the print anywhere widget 202 has detected the presence of the print job, it continues to monitor the file to determine whether the printer driver 204 has finished writing out the print data. Once the print data driver 204 is finished with the file, the print anywhere widget 202 moves the file to a new uniquely named directory, e.g., job_1234452244. This allows the print driver 204 to begin processing another document and avoid a file name conflict with the named job.prn file. In one embodiment, the print anywhere widget 202 also changes the file name to human understandable name for the print job. In one embodiment, the print anywhere widget 202 open the job.prn file and searches the Printer Control Language (PCL) text for the job name field which includes the original name of the document. The extracted name is used as the human understandable name for the file. Once renamed, the print anywhere widget 202 sends a signal to the widget manager 206 along with the file name to register the file with the widget manager 206. Once registered, the widget manager 206 handles further processing of the print file.

The print driver 204 is software and routines that convert data to be printed into a format specific for printer. In one embodiment, the printer driver 204 is installed on the computing device 102 such that when a print operation is selected from any application operating on the computing device 102, a dialogue box is presented and the print driver 204 is one possible printing option. More specifically, the printer driver 204 is named "PrintAnywhere" and is just one selectable option among any other printers available to the computing device 102. In one embodiment, the print driver 204 is a production Printer Control Language (PCL) printer driver. In essence, the printer driver 204 creates a "virtual printer" to which the user may print a document. Once the printer driver 204 is installed on the computing device 102, rather than associating the print driver 204 with a single physical device, the present invention assigns the printer driver 204 to a special "port." For the present invention, the port of the print driver 204 is set to point to a local directory on the computing device 102. For example, the port points to C:\RICOH\PrintAnywhere\job.prn. Thus, when the print driver 204 is used to create a print file, the print file is stored in the directory C:\RICOH\PrintAnywhere\ and the file is given a filename of job.prn.

The widget manager 206 is software and routines executable by a processor computing device 102. The widget manager 206 is adapted for and handles communication with one or more of the printers 106A-N, specifically their print anywhere receiving modules 110. The widget manager 206 also manages and maintains information about print anywhere receiving modules 110. For example, in one embodiment, the widget manager 206 keeps track of information about individual activations, including the IP address of the printers 106A-N that requested the activation, as well as any information the printers 106A-N may have supplied about alternate protocols it supports (e.g. for direct printing). The widget manager 206 manages the registration of the print anywhere receiving modules 110, a location at which the print anywhere receiving modules 110 can retrieve data, responses to requests from the print anywhere receiving modules 110 for information, and storage and management of information for the print anywhere receiving modules 110. The widget manager 206 also generates and sends advertisements that a print job is available. The widget manager 206 also interacts with the print anywhere receiving modules 110 to determine the print capabilities of their corresponding printer 106A-N. In one embodiment, the widget manager 206 uses software such as Bonjour by Apple Computer, Inc of Cupertino Calif. as a service discovery protocol for advertising the print job, exchanging service and parameters and other information. Furthermore, the widget manager 206 also removes print jobs from the directory of the print anywhere widget 202 once the print jobs have been printed and confirmation is received from the print anywhere receiving module 110.

Print Anywhere Receiving Module 110A-110N, 110P

Figure 3:
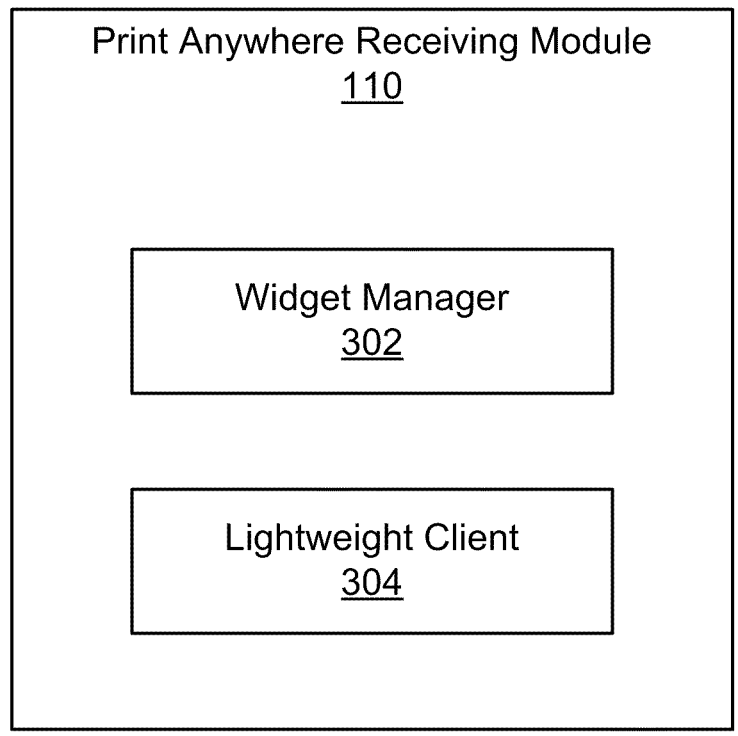
FIG. 3 is a block diagram of an embodiment of a print anywhere receiving module in accordance with the present invention.

FIG. 3 is a block diagram of an embodiment of the print anywhere receiving module 110 in accordance with the present invention. The print anywhere receiving module 110 comprises a widget manager 302 and a lightweight client 304.

The widget manager 302 is software and routines executable by a processor of the printer 106. The widget manager 302 is adapted for and handles communication with one or more computing devices 102, specifically their print anywhere sending modules 108. The widget manager 302 is also adapted for communication with the lightweight client 304. The widget manager 302 of the receiving module 110 is similar to and the counterpart of the widget manager 206 of the sending module 108. The widget manager 302 monitors for advertising messages indicating the availability of a print job. The widget manager 302 also communicates with the print anywhere sending module 108 to determine the required print capabilities for the print job. The widget manager 302 also interacts with the print anywhere sending module 108 to receive the information necessary to print the print job. For example, the widget manager 302 determines the location of the print job at the computing device 102 and copies the print file to the printer 106. The widget manager 302 also interacts with a lightweight client 304 and provides the lightweight client 304 with information such that the lightweight client 304 presents user interfaces on the printer 106, sends the print file to the print engine of the printer 106, and send a confirmation of printing and other information to the print anywhere sending module 108.

The lightweight client 304 is software and routines executable by the processor of the printer 106. The lightweight client 304 generates user interfaces such as the availability of the print anywhere widget. In one embodiment, the lightweight client 304 also interacts with the printer 106 to cause control buttons and the name of the print job to be displayed. In one embodiment, the lightweight client 304 is capable of displaying a plurality of print jobs from the same or different print anywhere sending module 108. In one embodiment, the lightweight client 304 interacts and controls the widget manager 302 such that when the lightweight client 304 receives selection of a document and a start command, the lightweight client 304 instructs the widget manager 302 to retrieve the print file from the corresponding computing device 102 and then the print file is sent to the print engine of the printer 106 for output. The lightweight client 304 is adapted for communication with the widget manager 302, the printer 106 and its components, and the print anywhere sending module 108.

Print Key

Referring now to FIGS. 4A-6, a third embodiment of a print anywhere system 400 in accordance with the present invention is described. This third embodiment of the print anywhere system 400 utilizes a print key 402 as will be described in more detail below with reference to FIG. 4B. The third embodiment of the print anywhere system 400 comprises a computing device 102, a printer 106 and the print key 402. This third embodiment of a print anywhere system 400 provide a user experience where a user uses a Print Key 402 to easily print any of their documents from their computer 102 to a public printer 106.

In this embodiment, the printer 106 is a conventional type. The printer 106 is able to understand and process files in a PCL printing protocol. In one embodiment, the printer 106 is able to print color, or duplex. The printer 106 also includes a USB connection or network connection. In one embodiment, the printer 106 includes a USB port capable of receiving and communicating with the print key 402. In another embodiment, the printer 106 is coupled to a computer and display (not shown) of a conventional type. The display for is example is a touch screen display such as a Xenarc 7" touch screen display to provide a small form factor touch screen UI for the printer 106. This allows the user to interact with the printer 106 without the need for a keyboard or mouse.

The computing device 102 is a conventional type such as that described above. In another embodiment, the computing device 102 is a Mac Mini, running OS X. In alternate embodiments, the computing device 102 is a personal computer running Windows XP professional OS. In either embodiment, the computing device 102 includes at least one open USB port capable of receiving and communicating with kinky 402.

The print key 402 is a storage device such as a USB flash drive. In one embodiment, the print key 402 is a standard USB memory stick. For example, the print key 402 is a memory stick of 512 MB. Storage capacity of the print key 402 can be greater or smaller, but this size was chosen to discourage people from walking off with the print key 402, and the other components of the print key 402 requires about 140 MB of space which leaves a "reasonable" amount of space to store print jobs on the memory stick (FOB). In one embodiment, the print key 402 has storage capacity to hold 10-20 print jobs.

Figure 4A:
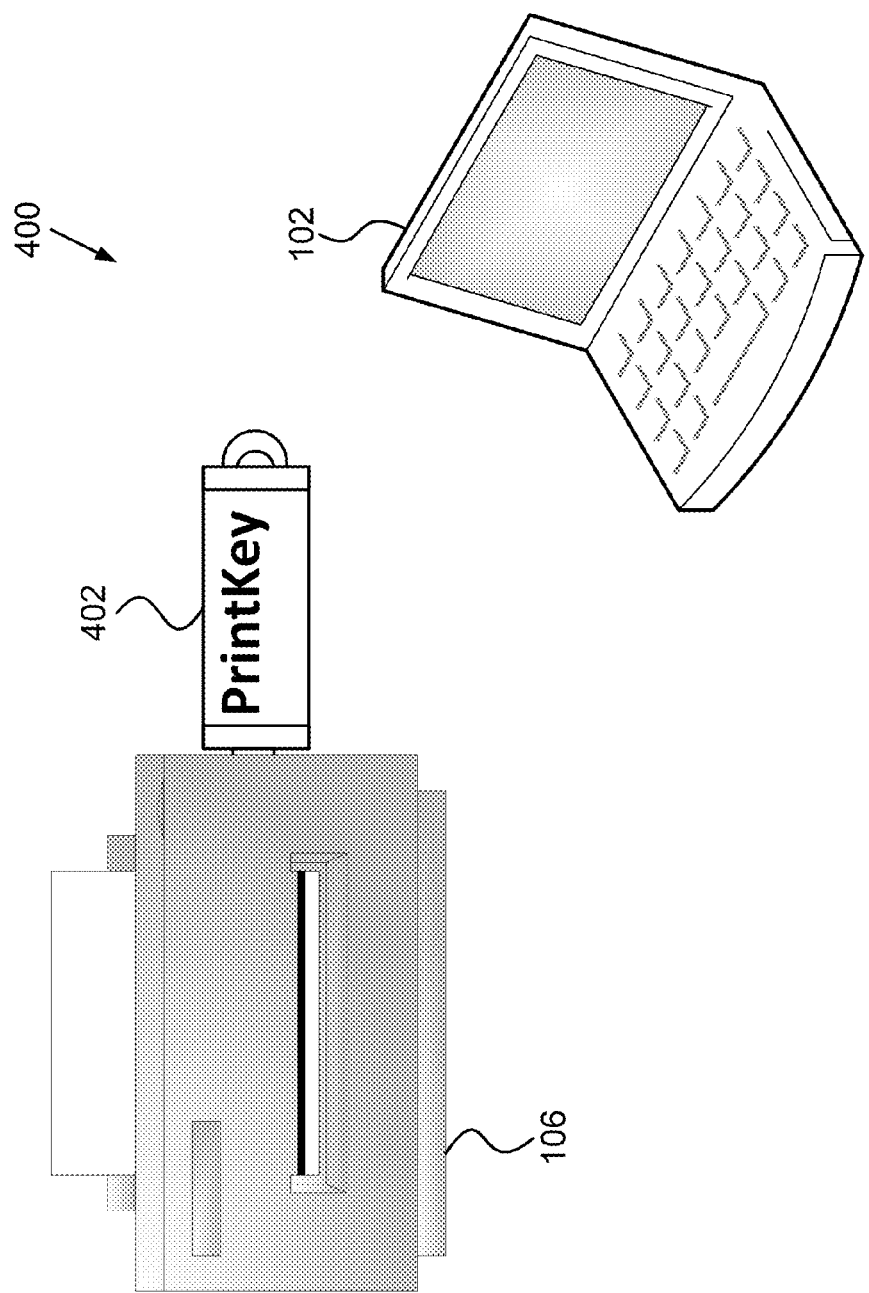
FIGS. 4A, 4B, 5 and 6 are block diagrams of a third embodiment of a print anywhere system in accordance with the present invention during initialization, transfer and printing.
Figure 4B:
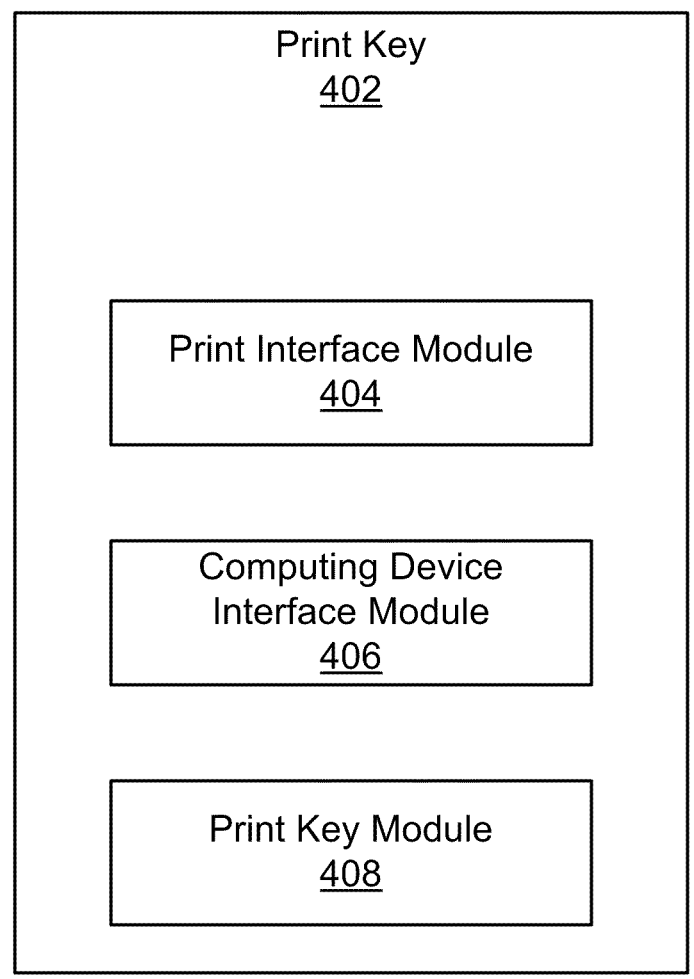

Referring also now to FIG. 4B, the print key 402 is shown as including a printer interface module 404, a computing device interface module 406, and a print key module 408.

The printer interface module 404 is software and routines operable on a processor of the printer 106. The printer interface module 404 is adapted for communication with the print key module 408 and the printer 106. The printer interface module 404 allows the print key module 408 to perform operations on the printer 106 and input a print file to the printer 106.

The computing device interface module 406 is software and routines operable on a processor of the computing device 102. The computing device interface module 406 is adapted for communication with the computing device 102 and the print key module 408. The computing device interface module 406 allows the print key module 408 to perform operations on the computing device 102 including the generation of a print file and the presentation of user interfaces as will be described in more detail below.

The print key module 408 is software and routines operable on a processor of the computing device 102. The print key module 408 is coupled for communication with the computing device interface module 406 and the printer interface module 404. The print key module 408 generates a virtual printer on the computing device 102 to which is coupled and installs generic printer driver for that virtual printer. The print key module 408 also changes the default printer of the computing device 102 to the virtual printer. The print key module 408 also records the setting of the default printer prior to changing it such that after printing has been completed, the default printer of the computing device 102 can be reset back to its original setting. The print key module 408 also generates and presents user interfaces (as will be described below) to instruct the user how to print documents using the print key. Finally, the print key module 408 controls the computing device 102 to copy a print file generated by the printer driver to the print key 402. In one embodiment, the print key module 408 includes an installer, a printer driver and other routines for communicating with the printer 106 and the operating system of the computing device 102.

Figure 5:
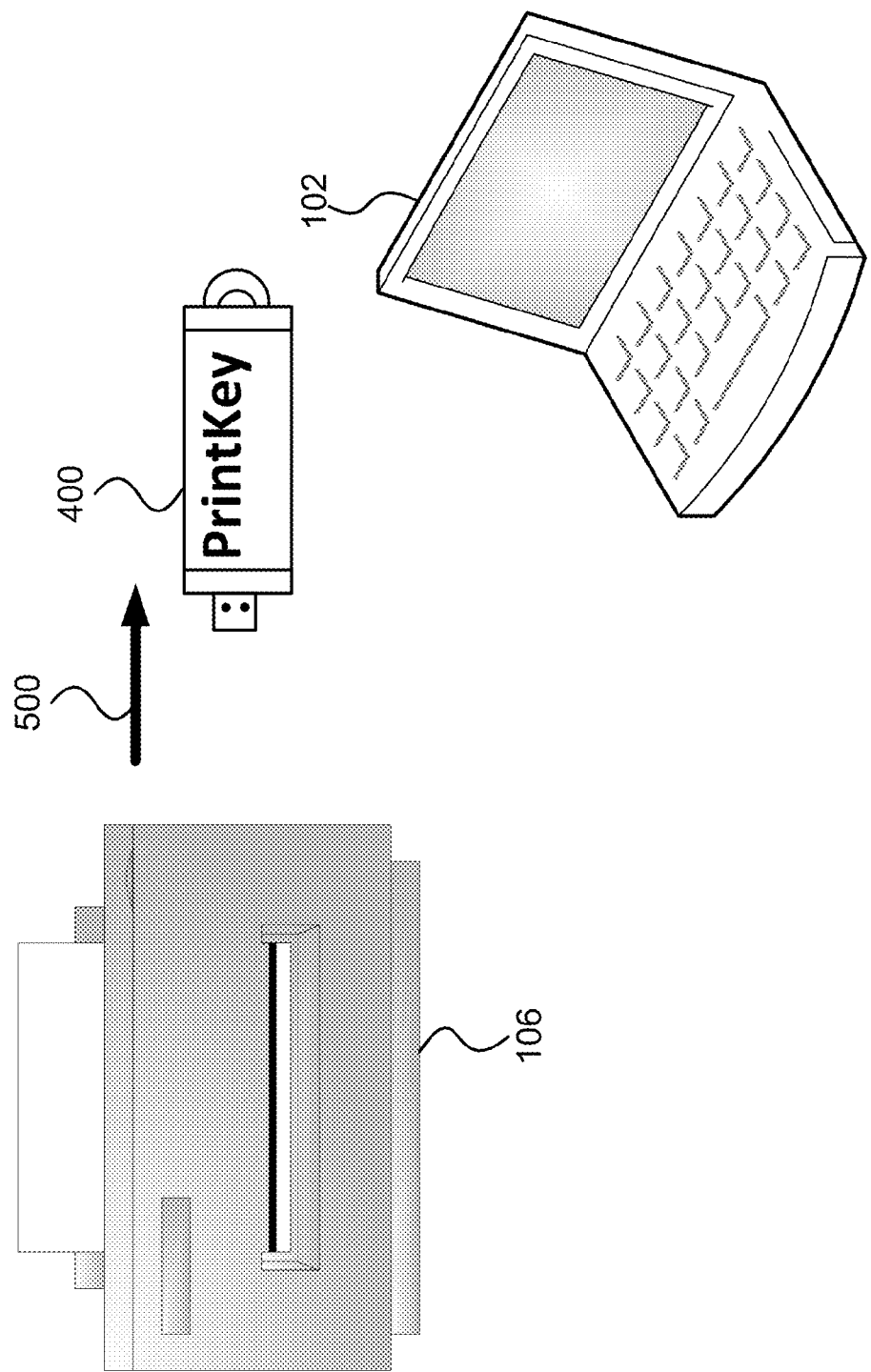
Figure 6:
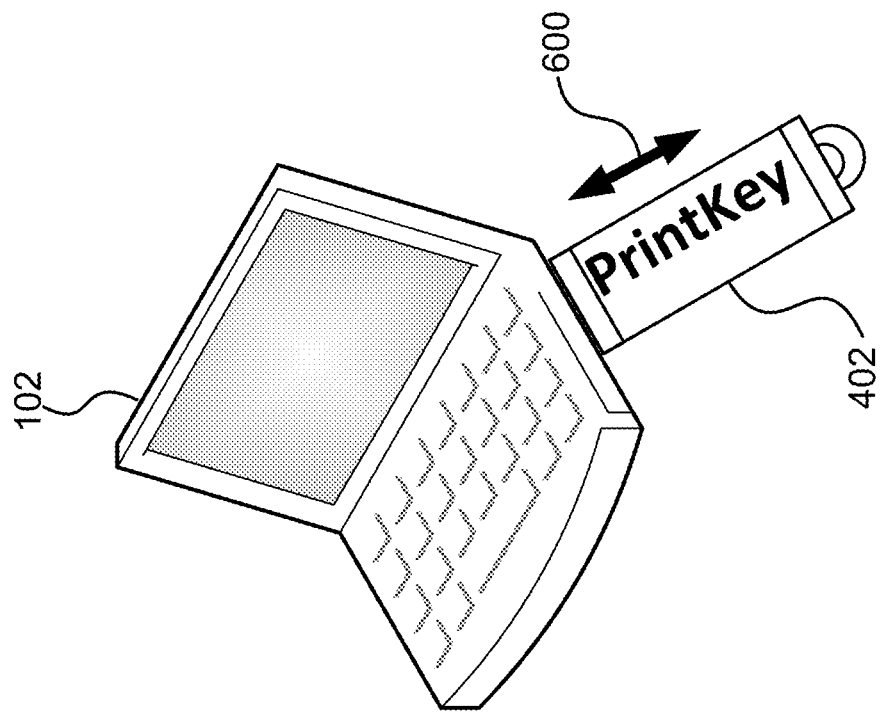
Figure 6:
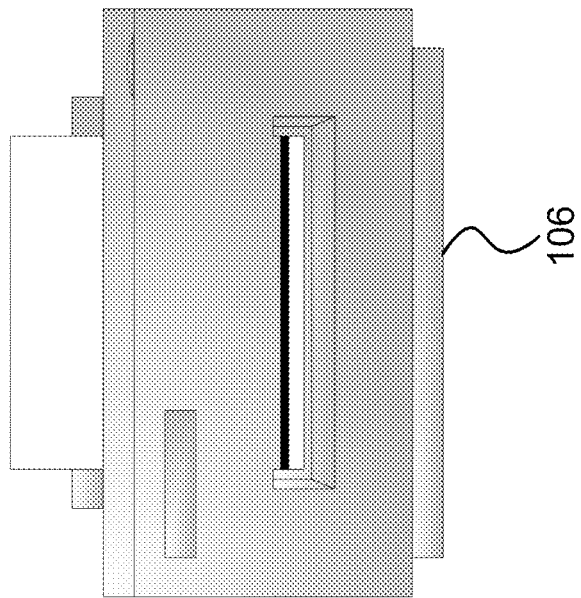

The operation of the print key 402 can be better understood with reference to FIGS. 5 and 6. As shown in FIG. 5, the process begins when the user removes 500 the print key 402 from the printer 106. Next the user inserts 600 the print key 402 into a USB port of the computing device 102. This is shown by the transition between FIG. 5 and FIG. 6.

Typically, to prevent malware that has been accidentally put onto a USB flash drive from running, most operating systems will not run software automatically from a USB flash drive (CD's can still do this, as you often see an installation script start up when you first insert a CD into your system). Fortunately, it is possible to ask the user if it is ok to install something when a USB flash drive, e.g., the print key 402, is inserted. In one embodiment, the print key 402 includes an autorun.ini file (standard Windows XP way) that starts the installation process once the user approves the installation.

The installer of the print key module 408 first creates a port on a client of the computing device 102. This port (e.g., PrintKeyPort) is a standard LPR port, using the lp print queue. Once the port is created, the print key module 408 creates a new virtual printer, referred to as PrintKey, and provides the printer driver for that virtual printer. The print key module 408 also assigns the new virtual printer to use the newly created port. The present invention advantageously uses a port and virtual printer combination to remove any dependencies on how a computing device 102 is configured. If the invention relies upon a default port, (say LPT1 or COM1), they might not exist or already be in use. By creating a new port, the present invention avoids these issues. In one embodiment, the printer driver is a very basic PCL6 printer driver. Unlike typical printer drivers, which spool their output to the printer they are pointed to, the printer driver of the present invention outputs its results to a file. The print key print driver is a very simplified version of "print to file," where the file name and destination are fixed. In one embodiment of the present invention, the printer driver emits the file C:\Ricoh\printjob.prn. The present invention advantageously frees the user from having to know what printer to select to successfully print via the print key 402 by setting the default printer to our newly created virtual PrintKey printer. Because the virtual printer is a transient device (i.e., it will "go away" when the print key 402 is removed), print key module 408 needs to remember what the user's previous default printer was, and restore it when the print key 402 is removed.

Figure 10:
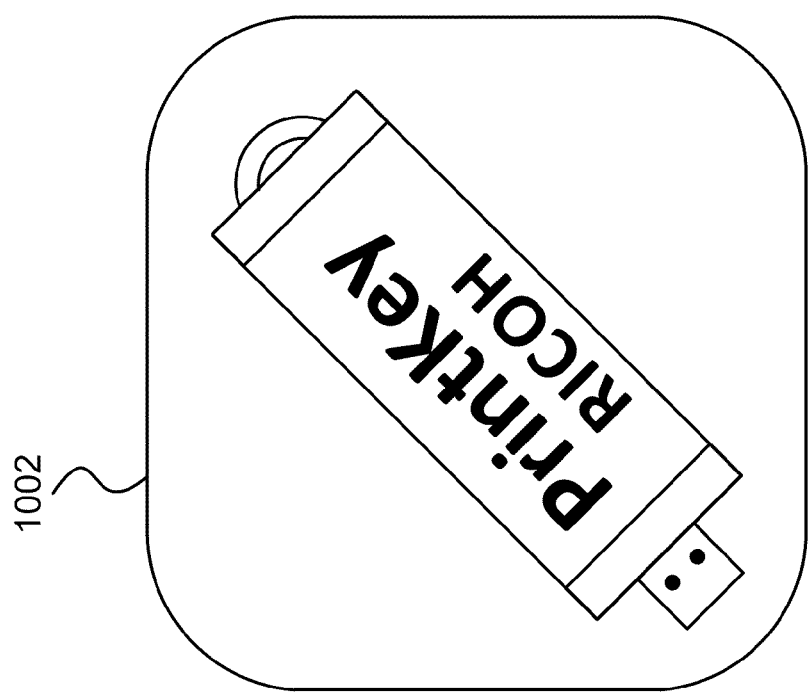
FIG. 10 is a graphic representation of a screen showing a visual representation indicating the third embodiment of the print anywhere system is operational.
Figure 12:
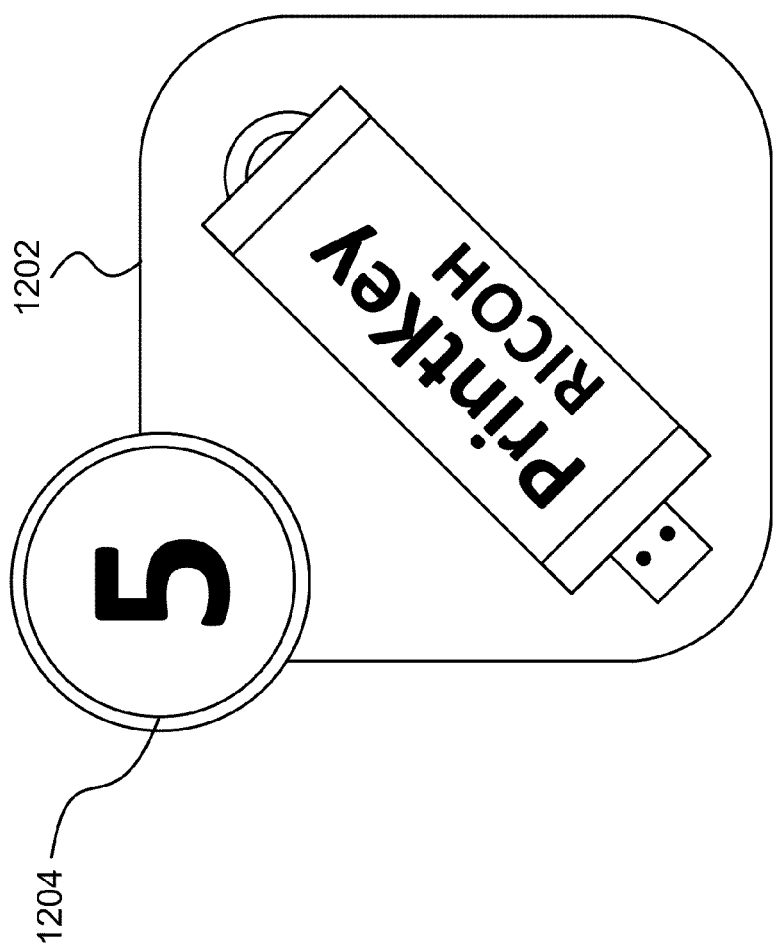
FIG. 12 is a graphic representation of a screen showing a visual representation indicating a number of documents stored on a print key in accordance with one embodiment of the present invention.

In order to provide the user with a "widget like" experience, the present invention includes a small application that runs on the computing device 102. To keep the installation and footprint of the present invention as small as possible, the application runs off the print key 402. In this way, the application does not need to be "installed" on the computing device 102. Also, it makes the process of uninstalling the print key application simple, since when the user removes the print key 402 (e.g., the USB flash drive), the software is physically uninstalled. In one embodiment, the Print Key application of the present invention provides the user with a visual indication that the print key application is running. One example of such a visual indication is shown in FIG. 10. The application is primarily used to let the user know they are still using a print key 402, and that they should remove the print key 402 when they want to print their documents. As users print their documents, the image of the desktop print key application changes, showing them the number of documents to be printed that are currently on the key. An example of a print key 402 with five documents stored upon it generates the visual representation shown in FIG. 12. FIG. 12 shows the presence of the print key 402 with an icon 1202 and numeral 1204 representing the number of documents stored on the print key 402.

Since the print driver creates a file (c:\Ricoh\printjob.prn) each time the user prints a document, the print key module 408 monitors the location to which the print driver writes to detect the creation and completion of a file. Since the print key applications not receive any secret is Asian signal indicating when the print driver is finished writing to the file, the print key module 408 continuously polls the location to which the print driver writes. This is important because: 1) the print key module 408 must move the *.prn file to the print key 402 (USB storage) as soon as possible—so the user can remove the USB drive and take it to the printer; and 2) The user may try to print another document which would overwrite the file they just printed. In one embodiment, the print key module 408 has a polling thread that is watching the c:\Ricoh directory for *.prn files. Once a file is created, the thread watches the file size. If the file size is increasing, it continues to wait. Once the file size has stabilized for a period of time (currently 1.5 seconds), the print key module 408 moves the file out of the c:\Ricoh directory and onto the USB flash drive. As a side note, knowing what the drive letter is for the print key 402 isn't obvious. To figure this out, when the Print Key application launches, it scans all the mounted drives, looking for a PrintKey.Readme.txt file at the root of each drive. The present invention assumes that only the print key 402 will have this file. Once the file has been found, the print key application can get what the drive letter is, and know what drive to put the *.prn files as they get created.

Once the files have been printed to the print key 402, the user removes the print key 402 from the computing device 102. This is shown in FIG. 6 by arrow 600. The user has finished printing all the documents they want to print, and are ready to get their printouts. When the user physically removes the print key 402, e.g., a USB flash drive, several things happen. It should be noted that the application is running from the print key 402, and the application knows what drive the USB flash drive is inserted to. The beauty of the present invention is that it is small enough to run in memory of the computing device 102, so the code needed for operation also in memory. So, when the print key 402 is physically removed, our application keeps running (in memory). The application includes another polling thread that is looking for the print key 402 to get removed (it is looking for the same ReadMe.txt file as above). When the print key 402 that the file was found on is no longer accessible, our application assumes that the print key 402 has been removed. The print key solution of the present inventions advantageously leaves the computing device in the same state as when it was first installed. When the application detects that the print key 402 has been removed, it 1) restores the user's previous default printer back to being their current default printer; 2) deletes the Print Key Printer (we could also delete the printer driver files, but currently we choose not to) and 3) shuts down our application. In one embodiment, the first 2 items are done via Windows XP/Vista supported *.vbs scripts (visual basic).

Figure 13:
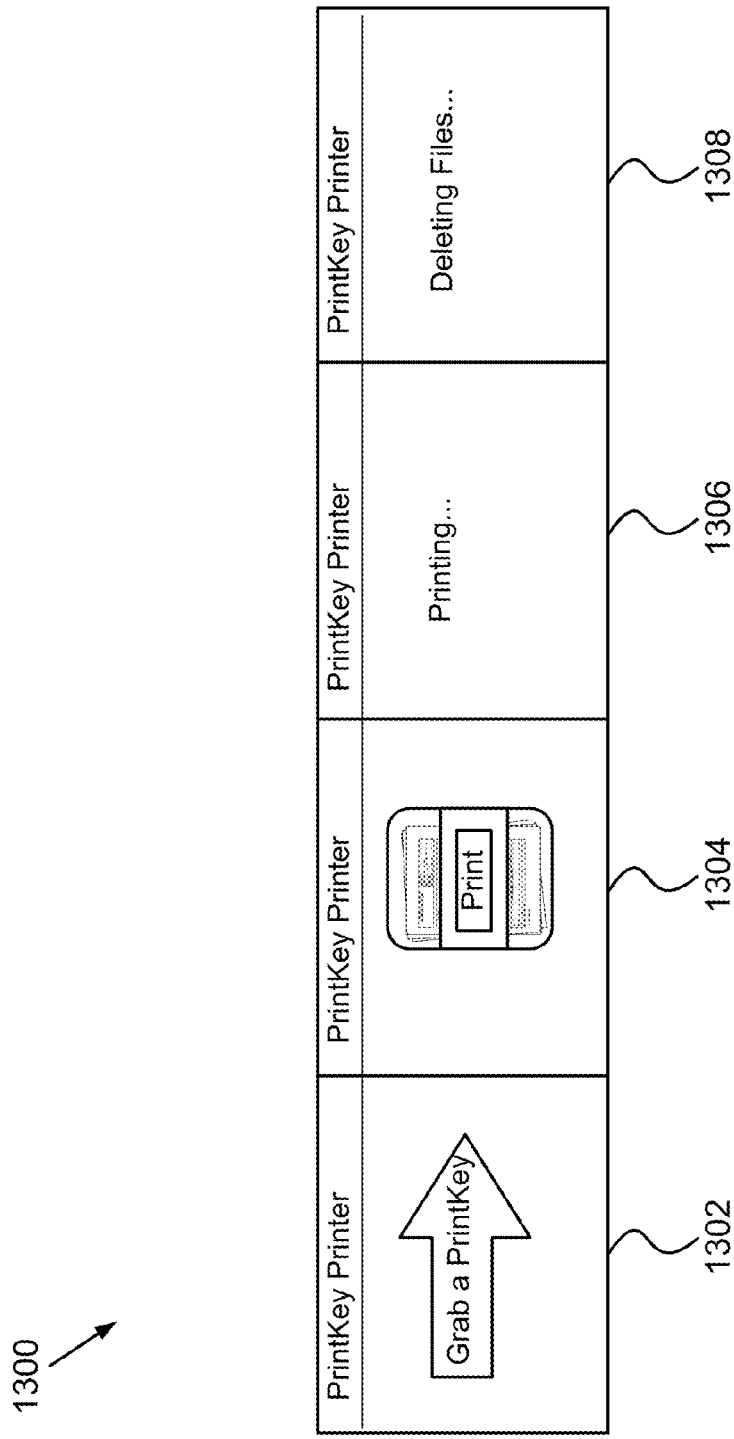
FIG. 13 is a graphic representation of a screen showing a visual representation showing the status of printing in accordance with the third embodiment of the present invention.

The process continues with the user inserting the print key 402 into the printer 106 or the computer (not shown) connected to the printer 106. A transition from FIG. 6 to FIG. 5 is illustrative of this step. It should be noted that in the embodiment shown in FIGS. 5 and 6 the printer 106 is a combination of a personal computer, a small LCD monitor, and the actual printer coupled to each other. The personal computer is used to provide a platform for the Print Key software to run on (in the event the printer 106 isn't capable of running the code), and providing the user with a user interface. One example of a user interface displayed on the display is shown in FIG. 13. FIG. 13 illustrates a user interface with different processing states available for the print key 402. The user interface includes a plurality of panes 1302, 1304, 1306 and 1308 each of which is highlighted when the print key 402 is performing the operations specified by each respective pane 1302, 1304, 1306 and 1308.

When the user approaches the printer 106, they are greeted with a screen telling them to grab the print key 402 to get started, or insert the print key 402 to start printing. The present invention includes software, referred to as a print key provider, that is running and monitoring for the removal of the print key 402 or the insertion of the new print key 402. Once the user inserts the print key 402, the provider: 1) validates that the USB device inserted is a valid print key 402; 2) looks in a specific directory of the print key 402 for *.prn files; and 3) presented to the user a user interface to print all documents found on the print key 402. The validation process is fairly simple. The present invention reads the USB Drive and searches for certain files to exist. If those files do not exist, the display presents a message that instructs the user that the printer 106 only support Print Keys. In one embodiment the print key provider offers to turn their USB drive into a print key 402. Once the USB Drive has been validated as a print key 402, the print key provider collects the *.prn files from the drive. The print key provider application (and PC) is configured to be able to print to the connected printer (we've installed the correct drivers etc). To get the documents to print, we simply pass (spool) the *.prn files to the default printer, and they print out. Once the documents have been printed, the print key 402 is initialized so that it will be ready for the next user. In one embodiment, the application removes all the *.prn files the user wanted to print. In another embodiment, the entire USB flash drive is erased and a fresh version of the Print Key software is copied on it. Once the Print Key has been cleaned, the UI returns the user to the landing page.

Methods

Figure 7:
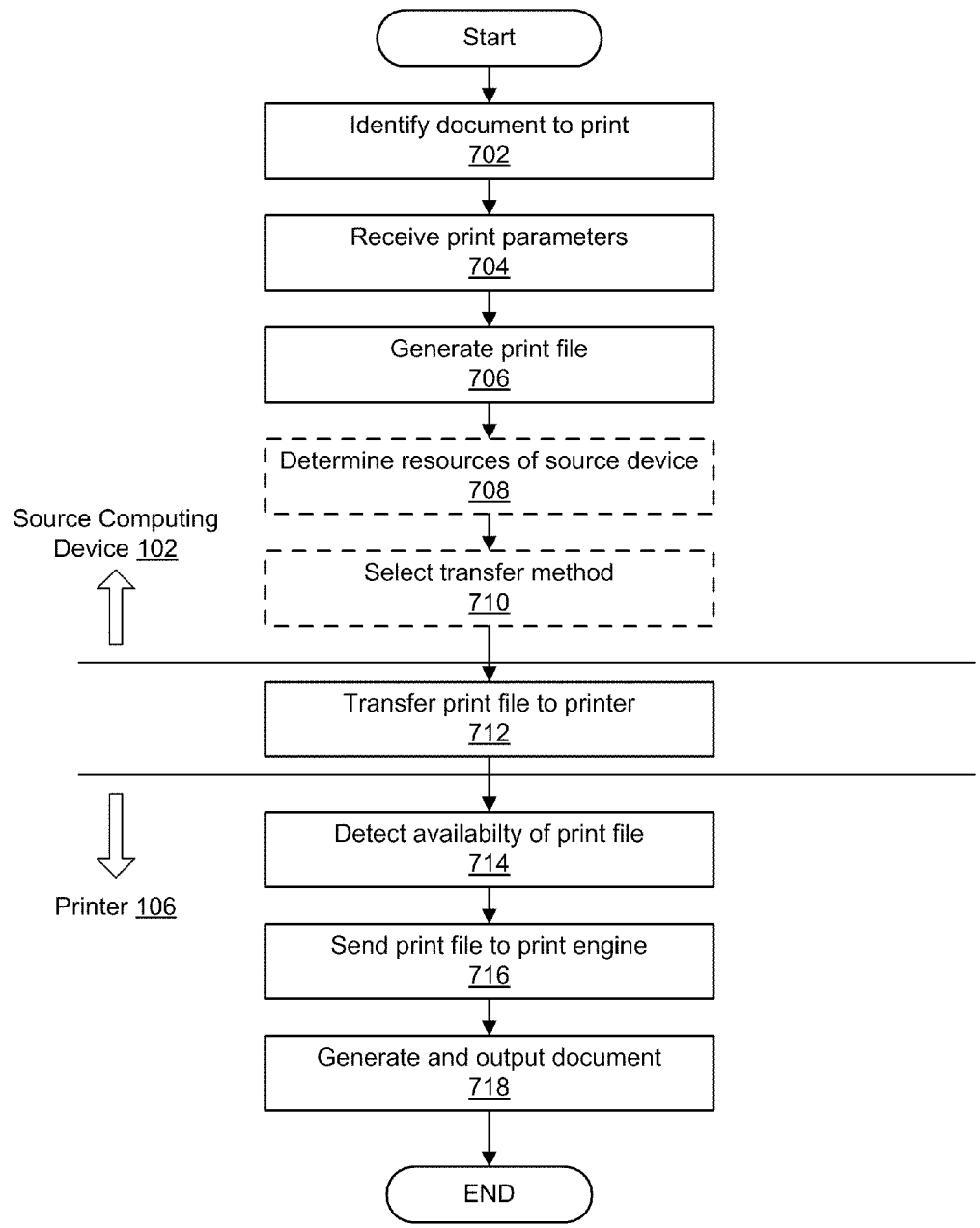
FIG. 7 is a flow chart of a general method for printing a document according to a first embodiment of the present invention.
Figure 11A:
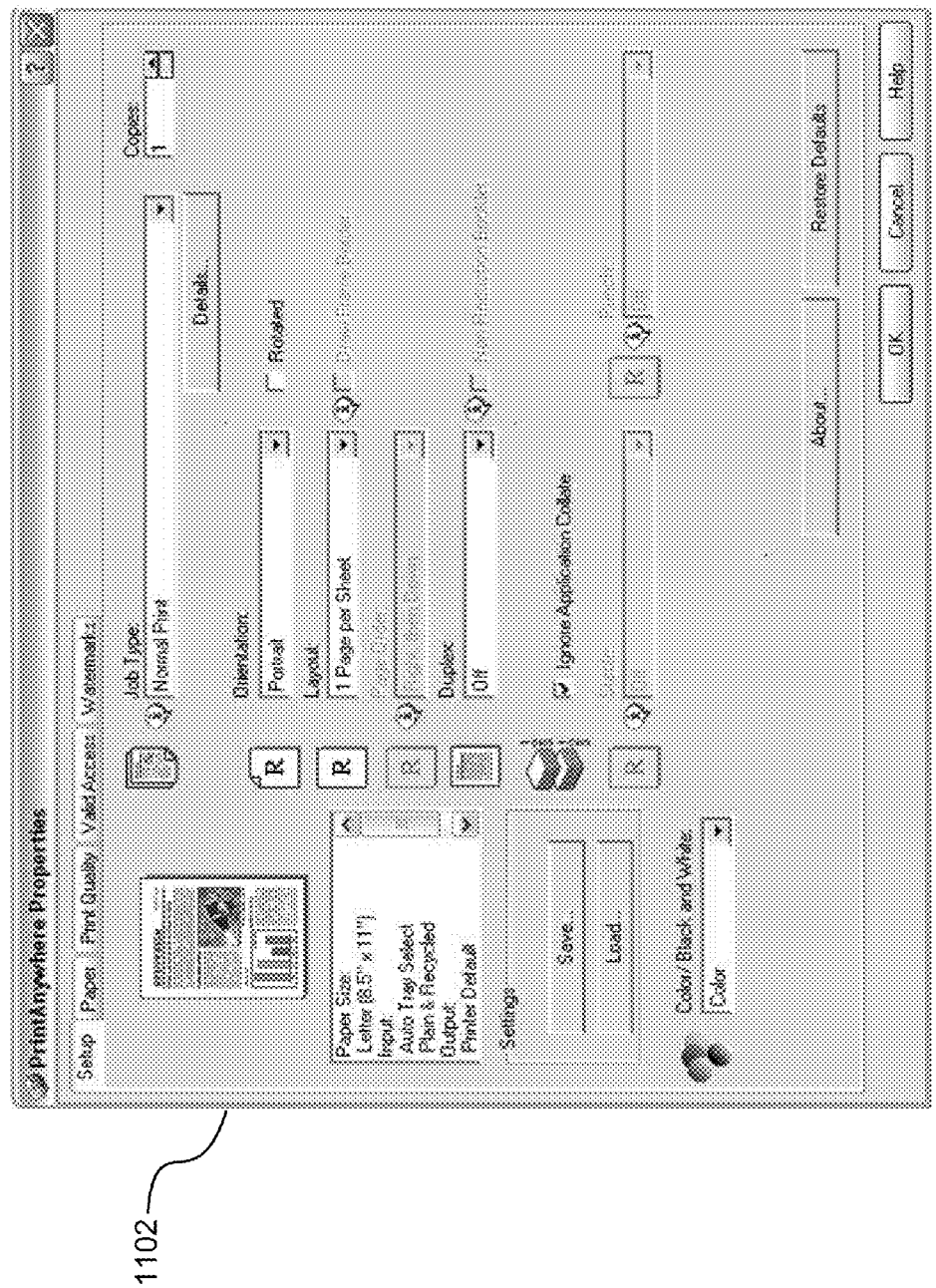
FIG. 11A is a graphic representation of a dialog screen for setting print anywhere properties in accordance with one embodiment of the present invention.
Figure 11B:
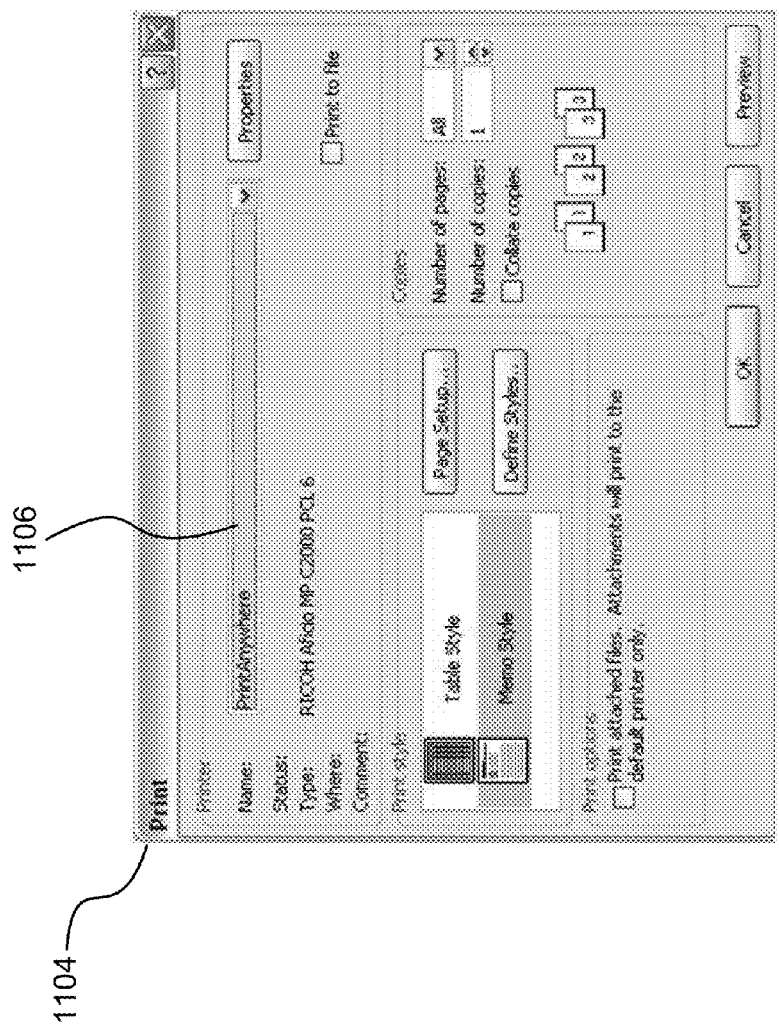
FIG. 11B is a graphic representation of a screen showing a print dialog for inputting printing parameters in accordance with one embodiment of the present invention.

Referring now to FIG. 7, a general method for printing a document according to the present invention will be described. The method begins by identifying 702 a document to print. For example, the user opens a document in an application (Word, PDF, website etc.) and selects print from the application's menu. The user selects the "Print Anywhere" printer from a list of printers in a print dialog box 1104 such as that shown in FIG. 11B. The print dialog box 1104 is similar to that generated and presented by many applications; however, since the print anywhere system 100 is installed on the computing device 102, the print anywhere printer is offered as an option in the pulldown menu 1106. As shown in FIG. 11B, the print dialog box 1104 offers other conventional options for the user to select. In another embodiment, the present invention also generates and outputs a print anywhere properties dialog box 1102, an example of which is shown in FIG. 11A. The print anywhere properties dialog box 1102 presents a variety of options for the user to select such as duplex, color, orientation, paper size and handling, etc. The user to select the options they desire and then they select the "OK" button, and the print anywhere properties dialog box 1102 closes. These print parameters are received 704 by the print anywhere sending module 108. In particular, these print parameters are provided to the print anywhere widget 202 and the print driver 204. The print anywhere driver 204 then images the document, with needed print options, and proceeds to generate 706 and stream the print data into a file. This file is the c:\Ricoh\Print Anywhere\job.prn file. This is particularly advantageous because the user prints using the existing printing infrastructure, use a production printer driver, yet not actually have to spool the print data to a real device until later.

Next, the method determines 708 the resources of the source computing device 102, and selects 710 a transfer method. These steps are optional to the method and therefore are shown with dashed lines in FIG. 7. In one embodiment, the method allows the print anywhere system 100 to print using either the embodiment described with reference to FIGS. 1A-3 or the print key embodiment described with reference to FIGS. 4A-6. Step 708 and 710 are used to automatically select between these two options. First the method determines the resources of source computing device 102. For example, if the computing device 102 does not have network access then only the print key embodiment is available for use. If the computing device is not have a USB port and the print key 402 inserted therein, then the first embodiment of the print anywhere system must be used. If both these resources are available, then the user has the flexibility to select either option for printing. Once the resources of the computing device 102 have been determined, the print anywhere system displays the available options to the user and receiving input from the user selecting one of the options in step 710.

After either step 710 or step 706, the method proceeds to transfer 712 the print file to the printer 106. In one embodiment, this is done by advertising the ability of the print job and sending the print file over the network 104 to the printer 106 in response to a request. In another embodiment, this is done by transferring the print file from the computing device 102 to print key 402, removing the print key 402 from the computing device 102 and inserting it into the printer 106.

Next, the processing of the present invention continues at the printer 106. The printer 106 detects 714 the availability of the print file. Again in one embodiment, the availability of the print file is detected once the print key 402 is inserted into the USB port of the printer 106. In another embodiment, the availability of the print file is detected once an advertisement from the computing device 102 has been received. Next the application of the present invention operable on the printer 106 retrieves the print file from either the computing device 102 or the print key 402. The print file is then sent 716 to the print engine of the printer 106. The print engine generates and outputs 718 a printed document based upon the print file, and the method is complete and ends.

Figure 8:
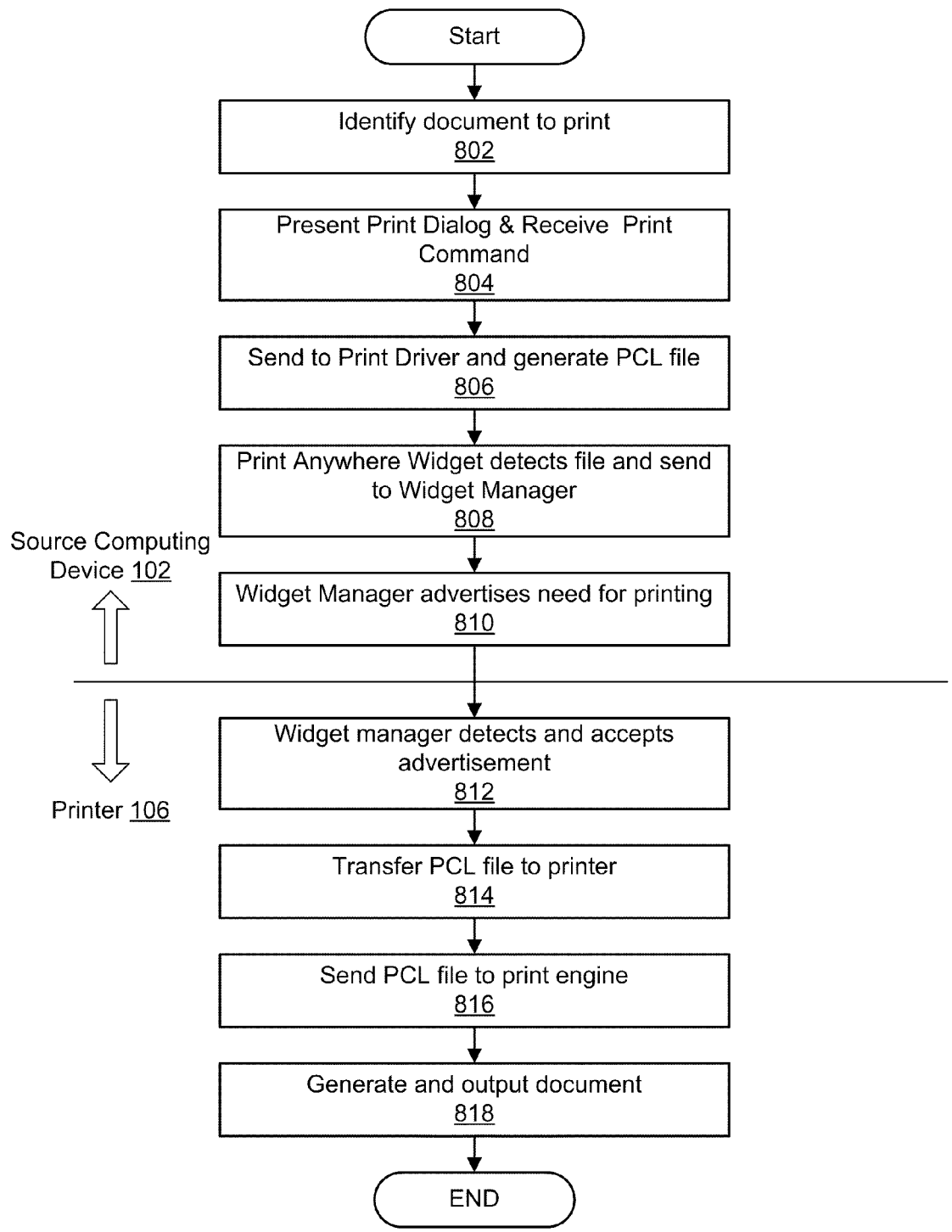
FIG. 8 is a flow chart of a method for printing a document according a second embodiment of the present invention.
Figure 14:
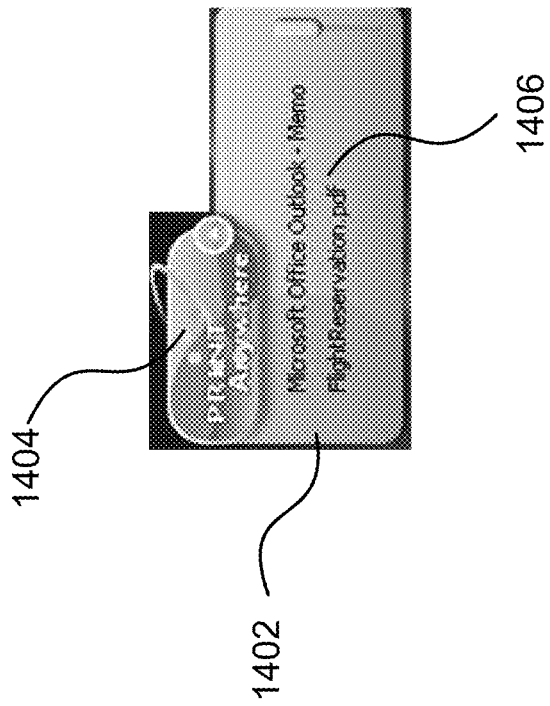
FIG. 14 is a graphic representation of a screen showing a visual representation that indicates the first embodiment of the print anywhere system is operational and printing status.
Figure 15:
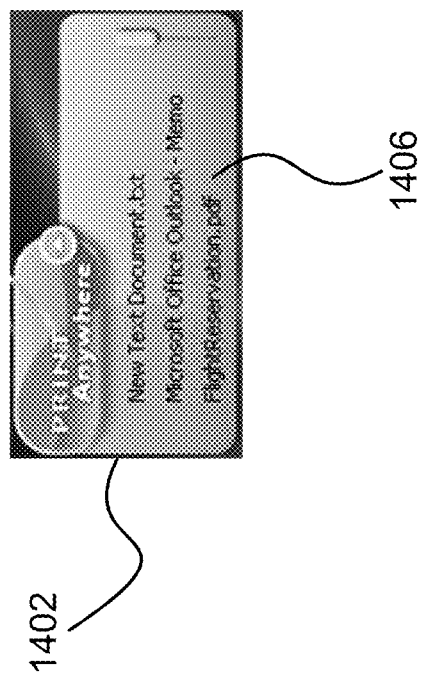
FIG. 15 is a graphic representation of a screen showing a visual representation that indicates files to print using the first embodiment of the print anywhere system of the present invention.

Referring now to FIG. 8, a method for printing a document using a first or second embodiment of the print anywhere system 100A, 100B will be described. The method begins by identifying 802 a document to print. Next the print anywhere widget 202 or the application presents 804 the print anywhere properties dialog box 1102 (see FIG. 11A) and the print dialog box 1104 (C. FIG. 11B). The user inputs the desired print parameters and commands using these dialog boxes 1102, 1104. In response to the commands input simpler by the user, then information or data for printing is sent 806 to the print driver 204 and the print driver 204 generates a PCL file. As has been described above, the print driver 204 operates independently from the print anywhere widget 202 but the print anywhere widget 202 monitors for the creation of the PCL file. Specifically, the print anywhere widget 202 detects 808 the completion of the PCL file and sends it to the widget manager 206. In one embodiment, the print anywhere widget 202 renames the PCL file and stores it in a predefined directory and notifies the widget manager 206 of the new file name and location. In one embodiment, the operation of the print anywhere sending module 108 including the print anywhere widget 202, the print driver 204 and the widget manager 206 are shown by a visual indicator that is presented on the display of the computing device 102. An example of a visual indicator is shown 1402 in FIGS. 14 and 15. The display of the visual indicator 1402 indicates that the print anywhere system 100 is operational on the computing device 102. The user interfaces of FIGS. 14 and 15 also provide other information. For example, FIG. 14 is a status indicator where the ellipse and circles 1404 are animated to indicate that a document is being printed and the list 1406 provides a name for the document that is being printed. FIG. 15 is a status indicator that includes a list 1406 of file names that are ready for printing and for which advertisers have been broadcast. Next, the widget manager 206 advertises 810 the need for printing. For example, the widget manager 206 sends a broadcast message indicating that the PCL files are available for printing and providing the filenames of the generated PCL files.

The method continues when a widget manager 302 of a print anywhere receiving module 110 detects and accepts 812 the advertisement sent by the widget manager 206 of the print anywhere sending module 108. The widget manager 302 then transfers 814 the PCL file from the source computing device 102 to the printer 106. The widget manager 302 then sends 816 the PCL file to the print engine of the printer 106. The print engine generates and outputs 818 the print a document and a method is complete and ends.

Figure 9:
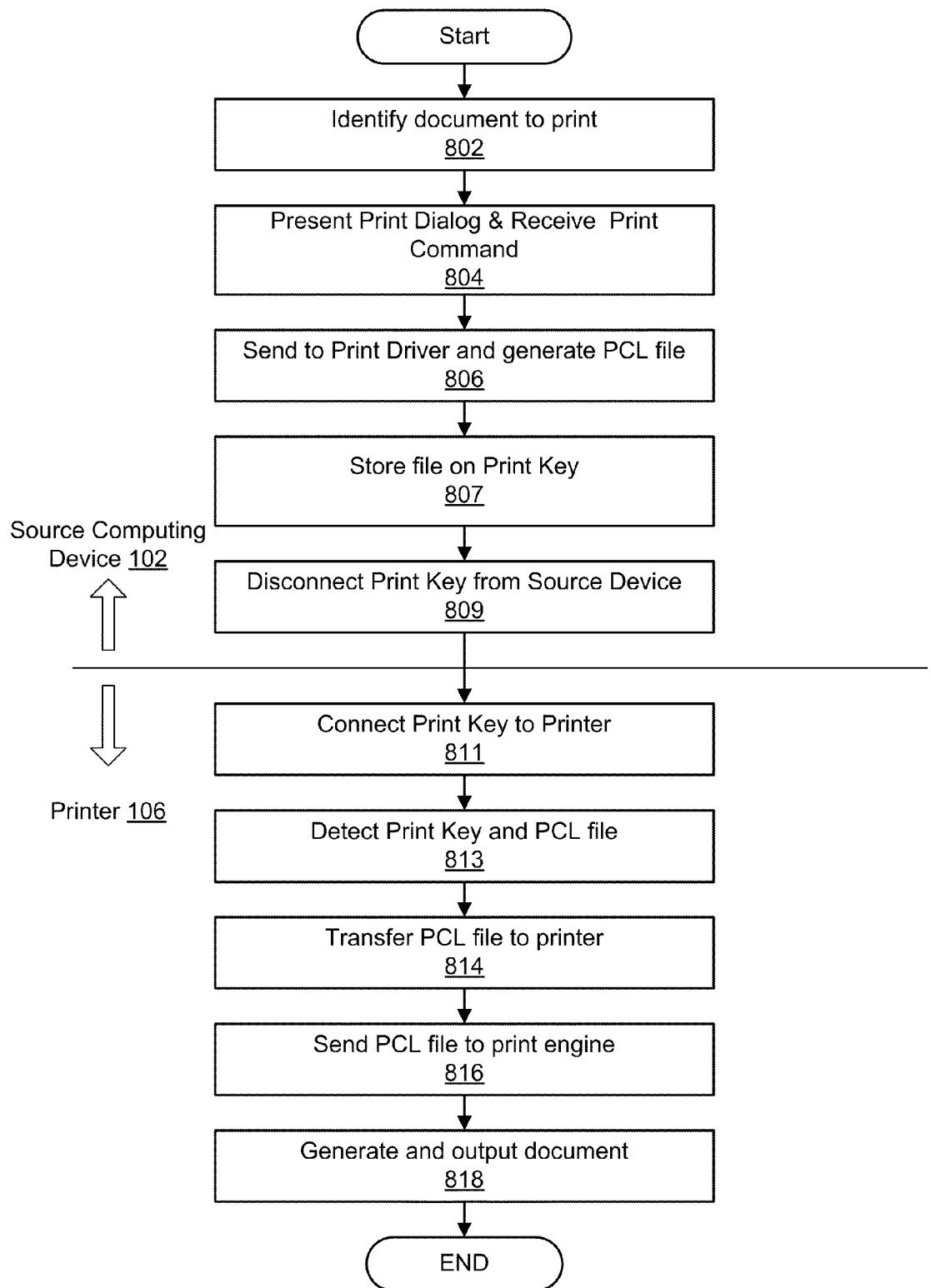
FIG. 9 is a flow chart of a method for printing a document according a third embodiment of the present invention.

Referring now to FIG. 9, a method for printing a document using a third embodiment of the print anywhere system 400 (e.g. using a print key 402) will be described. The method using the print key 402 is similar to the method described above with reference to FIG. 8. Therefore, similar reference numerals and descriptions are used for steps having the same or similar function in FIG. 9 as those described above for FIG. 8. The method begins by identifying 802 the document to print, presenting 804 the print dialog box and receiving print commands, and sending 806 data to the print driver to generated PCL file as has been described above. Next, the method stores 807 the PCL file on the USB flash drive or print key 402. In this embodiment rather than store the PCL file on the hard disk of the computing device 102, the PCL file is renamed and stored on the print key 402. Next, the user disconnects 809 the print key 402 from the source device 102. The user then connects the print key 402 to the printer 106. In one embodiment, the printer 106 includes a USB port and the print key 402 is inserted into the USB port. In another embodiment, the printer 106 is coupled to a computer having a USB port and the print key 402 is inserted into the USB port of the computer. Next, the print anywhere software operable on the printer or computer detects 813 the print key 402 and the PCL file. The print anywhere software transfers 814 the PCL file to the printer 106, sends 816 the PCL file to the print engine and generates 818 and outputs the printed document as has been described above.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. A computer implemented method comprising:
   receiving, with one or more processors, a document and one or more parameters specifying how the document should be printed;
   generating, with the one or more processors, a print file based on the document and the one or more parameters specifying how the document should be printed, the print file having a generic filename;
   detecting, with the one or more processors, creation of the print file by polling a first predefined directory location for a presence of the print file;
   storing, with the one or more processors, the print file by moving the print file from the first predefined directory location to a second predefined directory location to avoid a filename conflict with a next print file to be named with the generic filename at the first predefined directory location and renaming the generic filename for the print file that is moved to the second predefined directory location based on an original name of the document;
   transmitting, with the one or more processors, a broadcast message over a network, the broadcast message indicating to one or more printers an availability of the print file in the second predefined directory location;
   receiving, with the one or more processors, a request for the print file from a printer detecting the broadcast message;
   transmitting, with the one or more processors, the print file to the printer responsive to receiving the request from the printer;
   determining, with the one or more processors, whether the document has been printed using the print file; and
   erasing, with the one or more processors, the print file responsive to determining that the document has been printed using the print file.

2. The method of claim 1 wherein the print file is a Printer Control Language (PCL) file.

3. The method of claim 1 further comprises determining print capabilities of the one or more printers.

4. The method of claim 1 further comprising buffering the print file for the printer.

5. The method of claim 1 further comprising:
   determining whether the network including the one or more printers exists; and
   selecting a transfer method for transmitting the print file based upon determining that the network including the one or more printers exists.

6. The method of claim 5 further comprising receiving a user input indicating a transfer method for transmitting the print file.

7. The method of claim 1 wherein the one or more parameters specifying how the document should be printed include at least one from a group of print color, paper orientation, duplex printing, paper size and handling.

8. The method of claim 1 further comprising receiving an activation request from the one or more printers for activating printing service and storing an internet protocol (IP) address of the one or more printers.

9. The method of claim 1 further comprising storing one or more alternate protocols that each of the one or more printers support for printing the print file.

10. The method of claim 1 further comprising:
    sending the print file to a print engine associated with one of the one or more printers; and
    providing the document generated by the print engine from the print file.

11. The method of claim 1 further comprising indicating that the document is being printed and providing a name for the document that is being printed.

12. The method of claim 1 further comprises displaying a print dialog with selectable options for generating the print file.

13. A system comprising:
one or more processors;
a print driver stored on a memory and executable by the one or more processors, the print driver coupled to a document processing application, the print driver configured to receive a document and one or more parameters specifying how the document should be printed and to generate a print file based on the document and the one or more parameters specifying how the document should be printed, the print file having a generic filename;
a print anywhere widget stored on the memory and executable by the one or more processors, the print anywhere widget coupled to the print driver, and wherein the print anywhere widget is configured to detect creation of the print file by polling a first predefined directory location for a presence of the print file and to store the print file by moving the print file from the first predefined directory location to a second predefined directory location to avoid a filename conflict with a next print file to be named with the generic filename at the first predefined directory location and renaming the generic filename for the print file that is moved to the second predefined directory location based on an original name of the document; and
a widget manager stored on the memory and executable by the one or more processors, the widget manager coupled to the print driver and the print anywhere widget, and wherein the widget manger is configured to communicate with one or more printers to transmit a broadcast message over a network, the broadcast message indicating to the one or more printers an availability of the print file in the second predefined directory location, to receive a request for the print file from a printer detecting the broadcast message, to transmit the print file to the printer responsive to receiving the request from the printer, to determine whether the document has been printed using the print file and to erase the print file responsive to determining that the document has been printed using the print file.

14. The system of claim 13 wherein the widget manager is configured to determine print capabilities of the one or more printers.

15. The system of claim 13 wherein the print driver is configured to convert the document into the Printer Control Language (PCL) format.

16. The system of claim 13 wherein the widget manager is configured to receive an activation request from the one or more printers for activating printing service and to store an internet protocol (IP) address of the one or more printers.

17. A non-transitory computer readable medium which stores a computer program product therein for causing a computer to execute a method, the method comprising:
receiving a document and one or more parameters specifying how the document should be printed;
generating a print file based on the document and the one or more parameters specifying how the document should be printed, the print file having a generic filename;
detecting creation of the print file by polling a first predefined directory location for a presence of the print file;
storing the print file by moving the print file from the first predefined directory location to a second predefined directory location to avoid a filename conflict with a next print file to be named with the generic filename at the first predefined directory location and renaming the generic filename for the print file that is moved to the second predefined directory location based on an original name of the document;
transmitting a broadcast message over a network, the broadcast message indicating to one or more printers an availability of the print file in the second predefined directory location;
receiving a request for the print file from a printer detecting the broadcast message;
transmitting the print file to the printer responsive to receiving the request from the printer;
determining whether the printer has finished printing using the print file; and
erasing the print file responsive to determining that the printer has finished printing using the print file.

18. The computer program product of claim 17 wherein the print file is a Printer Control Language (PCL).

19. The computer program product of claim 17 further comprising buffering the print file for the printer.

20. The computer program product of claim 17 further comprising indicating that the document is being printed and providing a name for the document that is being printed.

* * * * *